United States Patent [19]

Yamaoka et al.

[11] Patent Number: 5,027,237

[45] Date of Patent: Jun. 25, 1991

[54] RECORDING-REPRODUCTION APPARATUS FOR MAGNETIC DISC PACKS WITH AN AUTOMATIC PACK CHANGING MECHANISM

[75] Inventors: Sueharu Yamaoka, Ikoma; Tadatoshi Fukuta, Sumoto, both of Japan

[73] Assignee: Sanyo Electric Co., Ltd., Osaka, Japan

[21] Appl. No.: 272,595

[22] Filed: Nov. 17, 1988

[30] Foreign Application Priority Data

Nov. 18, 1987 [JP] Japan .................................. 62-290940

[51] Int. Cl.⁵ .............................................. G11B 17/08
[52] U.S. Cl. .................................. 360/98.06; 360/105; 360/98.08
[58] Field of Search ............... 360/98.01, 98.04, 98.06, 360/98.08, 105; 369/194, 38

[56] References Cited

U.S. PATENT DOCUMENTS

| | | | |
|---|---|---|---|
| 4,170,030 | 10/1979 | Castrodole et al. | 360/98.06 X |
| 4,462,742 | 7/1984 | Hradel | 414/280 |
| 4,504,878 | 3/1985 | Gutmann | 360/98.06 X |
| 4,653,037 | 3/1987 | Nakayama et al. | 369/194 X |
| 4,901,172 | 2/1990 | Nakazawa et al. | 360/98.04 X |

FOREIGN PATENT DOCUMENTS

| | | |
|---|---|---|
| 0138005 | 4/1984 | European Pat. Off. . |
| 0109711 | 5/1984 | European Pat. Off. . |
| 0183463 | 4/1985 | European Pat. Off. . |
| 0113459 | 7/1982 | Japan . |
| 0079691 | 5/1984 | Japan . |
| 0093677 | 5/1985 | Japan . |
| 0080580 | 4/1986 | Japan . |
| 61-194671 | 8/1986 | Japan . |
| 61-267966 | 11/1986 | Japan . |
| 63-18572 | 1/1988 | Japan . |
| 2016794A | 9/1979 | United Kingdom . |

OTHER PUBLICATIONS

IBM Technical Disclosure Bulletin, vol. 25, No. 7B, Dec. 1982, Hatchett Disk Cartridge Player for Two--Sided Recording with One-Sided Backward Compatability.

Nikkei Electronics, Jul. 2, 1984, pp. 80–85, Nikkei McGraw-Hill.

Development of Stillvision System, Sanyo Technical Review, vol. 18, No. 2, Aug. 1986, pp. 26–41.

Imaging Technology, Konika Still Video System, Kogyo, Sep. 1987, pp. 100–105.

IBM Technical Disclosure Bulletin, vol. 15, No. 6, Nov. 1972, "Disk File", by R. A. Billings and P. R. Brinson.

*Primary Examiner*—R. S. Tupper
*Assistant Examiner*—Andrew L. Sniezek
*Attorney, Agent, or Firm*—Armstrong, Nikaido, Marmelstein, Kubovcik, & Murray

[57] ABSTRACT

An apparatus is for withdrawing the desired one of a plurality of magnetic disc packs accommodated in a pack holder and for transporting the pack to a specified signal recording-reproduction assembly, or for returning the pack from the assembly into the holder. The pack is guided, for reciprocating movement, along a straight path extending from a first rest position within the holder to a second rest position for recording or reproduction. A pack transport assembly, for reciprocatingly driving the pack, has projecting pack pushing levers for pushing the pack from the first rest position toward the second rest position.

5 Claims, 18 Drawing Sheets

RECORDING-REPRODUCTION APPARATUS FOR MAGNETIC DISC PACKS WITH AN AUTOMATIC PACK CHANGING MECHANISM

FIELD OF THE INVENTION

The present invention relates to a recording or reproduction apparatus for magnetic disc packs each having a disclike magnetic disc, and more particularly to a recording-reproduction apparatus having an automatic pack changing mechanism for withdrawing the desired one of magnetic disc packs accommodated in a pack holder and transporting the pack to a signal recording-reproduction position, or returning the pack from the recording-reproduction position into the holder.

BACKGROUND OF THE INVENTION

The so-called still video floppy disc system is known as an apparatus for recording and reproducing still pictures (see "Nikkei Electronics," July 2, 1984, pp. 80-85, published by Nikkei McGraw-Hill).

FIG. 17 shows a magnetic disc pack 1 for the still video floppy disc system. The pack comprises a flat rigid jacket 11, and a magnetic disc 12 rotatably housed in the jacket 11. The magnetic disc is usable for recording 50 still pirctures (in the case of field recording).

Such magnetic disc: packs are usable to provide an image filing system. For example, a multiplicity of still pictures can be filed if it is possible to provide an apparatus comprising a boxlike pack holder 2 for holding magnetic disc packs 1 therein as seen in FIG. 5, and an automatic mechanism for withdrawing the desired pack 1 from the holder, transporting the pack to a specified signal recording-reproduction position and returning the pack to the holder after recording or reproduction. If the apparatus is adapted for automatic pack changing, for example, for 10 magnetic disc packs, a filing system can be realized for recording or reproducing 500 images.

Unexamined Japanese Patent Publication SHO 61-267966 discloses an automatic magnetic disc: pack changing apparatus which is usable for such a filing system. FIG. 19 shows the disclosed apparatus. After a pack holder 2 is loaded into the apparatus with magnetic disc packs 1 accommodated therein, the pack holder 2 is moved in the direction of arrow A to bring the pack 1 to be used for recording or reproduction to a position opposed to a bucket 9 in a standby position. The pack 1 is then transported in the direction of arrow B and loaded into the bucket 9 by the pack transport mechanism to be described below. The bucket 9 is thereafter moved in the direction of arrow C along with the pack 1 to mount the pack 1 on a rotary drive shaft 91. The magnetic disc in the pack 1 is then driven by the shaft to record or reproduce signals. When to be changed for another pack, the pack is transported reversely.

With reference to FIG. 20, the pack transport mechanism comprises a pawl 92 engageable in a recess 17 formed in the jacket of the pack, and reciprocating means 93 connected to the pawl.

With the above automatic pack changing apparatus, the magnetic disc: pack 1 must be transported first in the direction of arrow B and then in the direction of arrow C perpendicular to the direction B as seen in FIG. 19. Accordingly the transport of the pack requires a complex mechanism, while the change of the pack requires a period of time since the pack needs to be transported a large distance with a change of its course. Moreover, changing the course of transport renders the pack very prone to damage.

Additionally, the transport mechanism is in direct engagement with the disc pack 1 as shown in FIG. 20, so that the accuracy with which the pack is positioned in place is dependent on the accuracy of positioning the transport mechanism. Since the pack transport mechanism is complex as stated above, it is difficult to set the pack in the specified recording reproduction position accurately.

SUMMARY OF THE INVENTION

An object of the present invention is to provide a recording-reproduction apparatus of simple construction for magnetic disc packs which is adapted to automatically rapidly change the pack free of the likelihood that the pack will be damaged during transport.

Another object of the invention is to provide a recording-reproduction apparatus which has an automatic pack changing mechanism and in which the magnetic disc pack can be set in a recording-reproduction position accurately.

The present invention provides a recording-reproduction apparatus for magnetic disc packs, the apparatus having an automatic pack changing mechanism and comprising a pack holder for accommodating a plurality of magnetic disc packs, a pack holder drive assembly for driving the pack holder in the direction of arrangement of the packs to position the pack to be used for recording or reproduction in a first rest position, and a pack transport assembly for transporting the pack from the first rest position to a second rest position for recording or reproduction, the path of transport of the pack from the first rest position to the second rest position extending on a straight line.

The pack transport assembly comprises guide device for guiding the movement of the pack from the first rest position to the second rest position, and a pack pushing lever movable into the pack holder through a hole formed therein for pushing the pack toward the second rest position, the guide device being provided with a positioning member for the pack in the second rest position to come into pressing contact with.

With the recording-reproduction apparatus of the present invention, the pack holder is reciprocatingly driven and thereby positioned in place, and the magnetic disc pack is thereafter set in position or collected in the pack holder only by being moved straight. This assures rapid pack changing free of the likelihood that the pack will be damaged during the transport, further rendering the pack transport assembly simple in construction.

The disc pack is transported merely by being pushed on its rear side with the pack pushing lever. Consequently, the pack is movable between the first rest position and the second rest position accurately, and can be brought to the second rest position with high accuracy by being pressed into contact with the positioning member. The pack pushing lever therefore exerts no influence on the accuracy with which the pack is positioned in place.

DESCRIPTION OF THE PREFERRED EMBODIMENT

Figure 1:
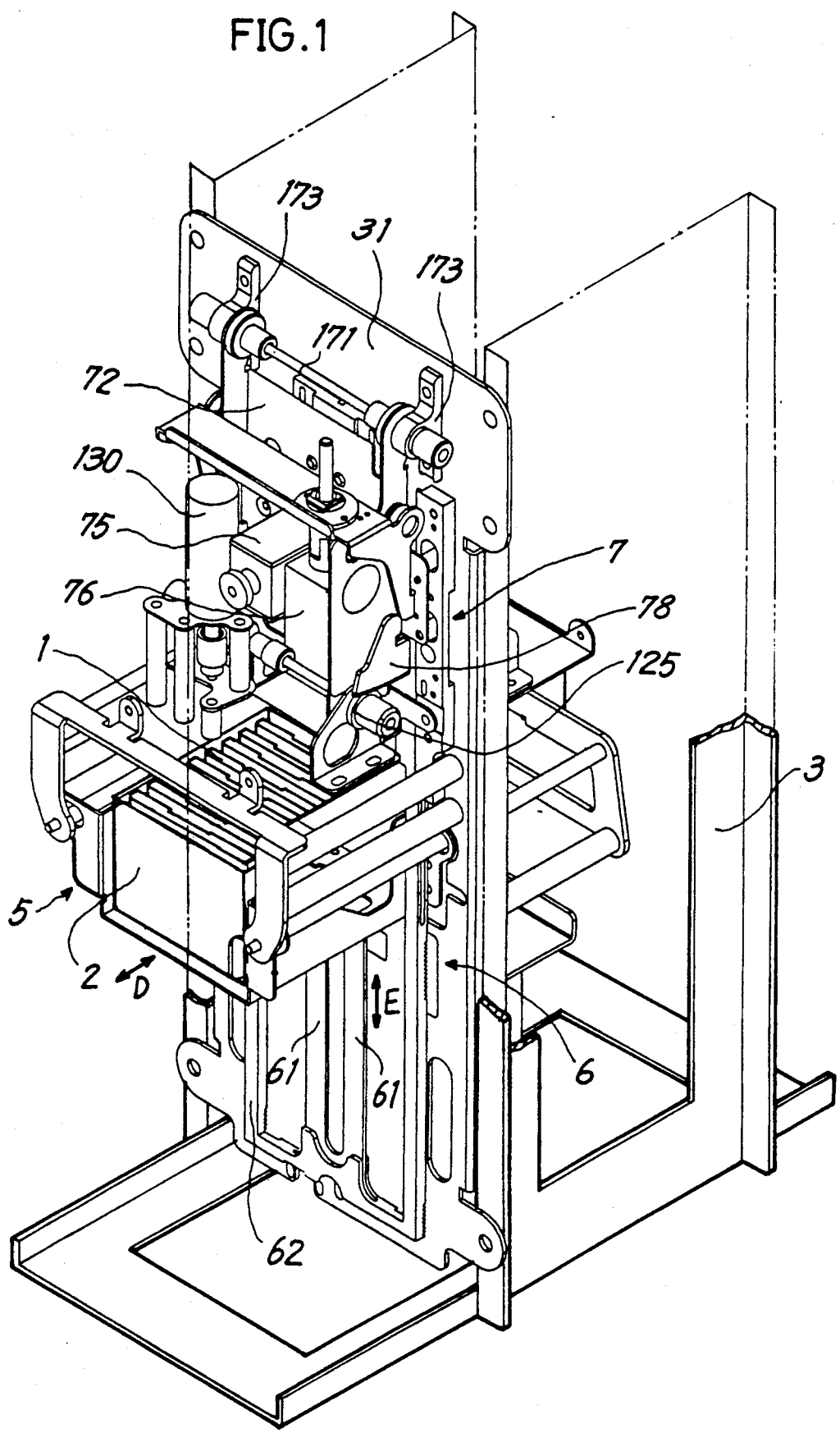
FIG. 1 is a perspective view partly broken away and showing a recording-reproduction apparatus embodying the invention.

An embodiment of the invention will be described below with reference to the drawings.

General Description of the Apparatus

First, the overall construction of a recording-reproduction apparatus embodying the invention will be described.

With reference to FIGS. 1 to 4, a vertical base plate 31 is fixed to a frame 3. Mounted on the base plate 31 are a pack holder 2 accommodating a plurality of magnetic disc packs 1, a pack holder drive assembly 5 for reciprocatingly driving the pack holder horizontally, a pack transport assembly 6 for upwardly transporting one of the packs 1 which is in a specified position (first rest position) within the holder 2 and setting the pack 1 in a recording-reproduction position (second rest position) immediately above the first rest position, and a chucking mechanism 7 for clamping the pack 1 in the second rest position. The chucking mechanism 7 is provided with a recording-reproduction assembly 8 (FIG. 16) including a spindle motor 82 for drivingly rotating the magnetic disc in the pack 1, a magnetic head, etc.

Figure 3:
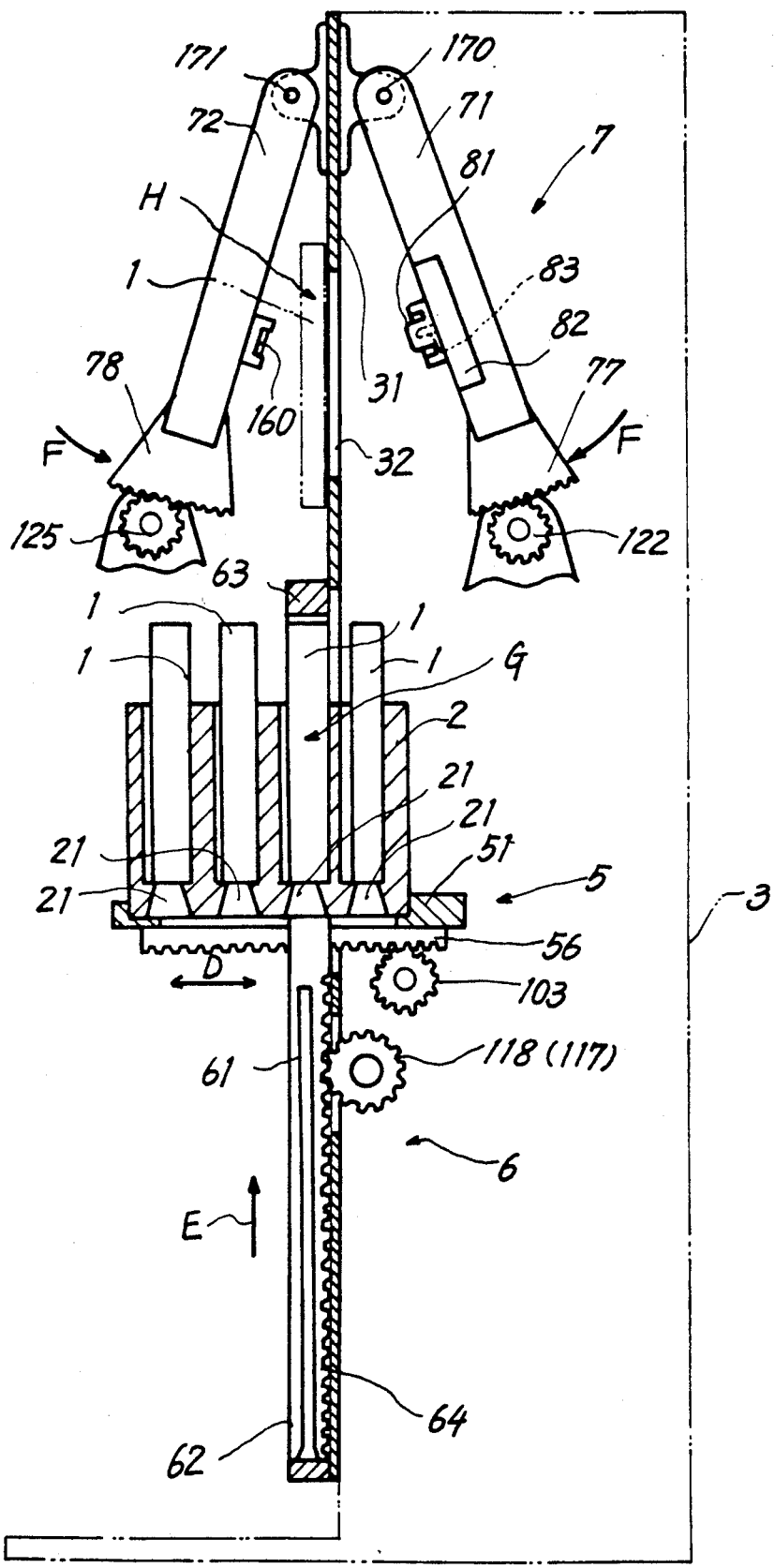
FIG. 3 is a fragmentary right side elevation partly broken away and showing the apparatus in a simplified form.

With reference to FIG. 3, the pack holder 2 is movable in the directions of arrows D by the operation of the holder drive assembly 5, whereby one of the packs 1 within the holder 2 selected is set in the first rest position along the base plate 31.

Next, the pack transport assembly 6 operates This assembly includes a transport member 62 having pack pushing levers 61 which move upward as indicated by an arrow E into the pack holder 2 through a hole 21 formed therein, pushing up the pack 1 within the holder 2.

Consequently, the magnetic disc pack 1 rises along guide means provided on the base plate 31 and eventually stops upon coming into contact with a positioning member (stopper) provided at a portion of the guide means. Thus, the pack 1 is set in the second rest position H.

The chucking mechanism 7 thereafter operates. This mechanism includes a pair of first and second bases 71 and 72 which pivotally move toward each other. As a result, a spindle 81 on the first base 71 fits into hub on the magnetic disc in the pack 1, and a pressing member 160 on the second base presses the magnetic disc against the spindle 81.

Consequently, the magnetic disc of the pack 1 fits in the specified posture to the spindle 81, which in turn drivingly rotates the disc at a high speed. At this time, the disc is clamped between a magnetic head and a pad (disc guide plate) for recording or reproducing signals.

On completion of recording or reproduction, the chucking mechanism 7 opens, releasing the pack 1. The transport member 62 of the pack transport assembly 6 thereafter moves down, transporting the pack 1 downward and eventually returning the pack to the interior of the holder 2.

With the present apparatus, the magnetic disc pack 1 can be set in the recording-reproduction position or collected in the holder 2 only by being moved upward or downward after the holder 2 has been positioned in place. The pack 1 is therefore changeable very rapidly free of likelihood of damage.

Moreover, the pack 1 can be transported to the recording-reproduction position only by being pushed up with the pack pushing levers 61. This renders the pack transport assembly 6 simple in construction.

The apparatus will be described below in greater detail.

Pack Holder 2

Figure 5:
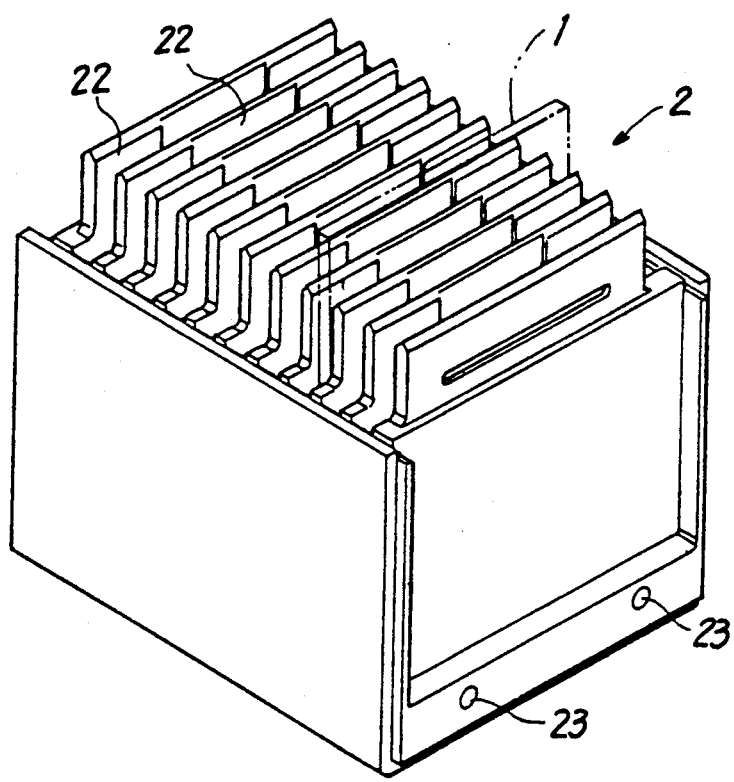
FIG. 5 is a perspective view showing a pack holder.
Figure 6:
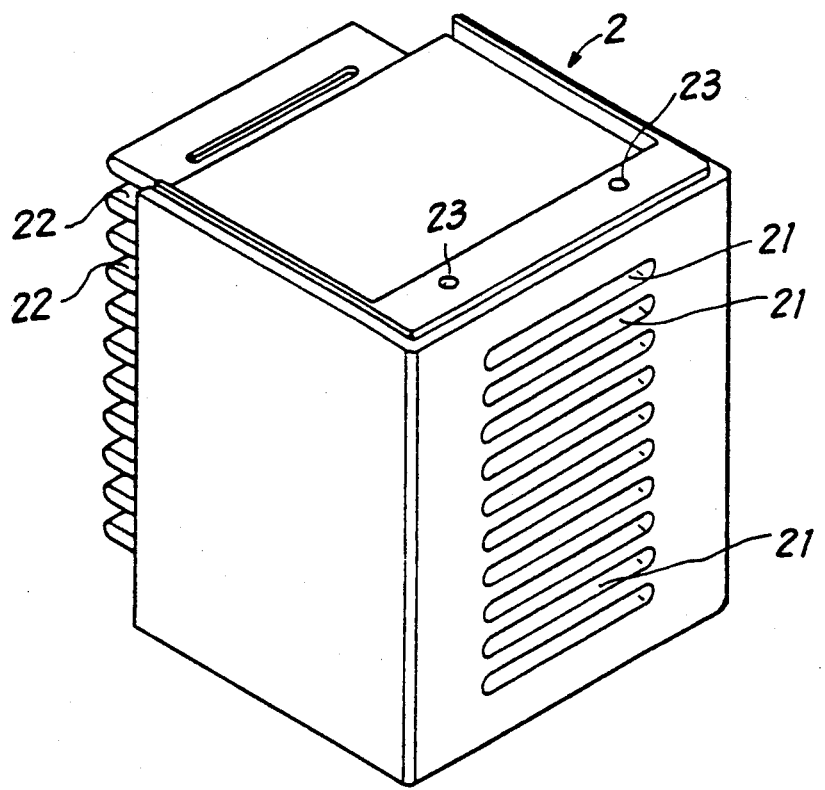
FIG. 6 is a perspective view showing the bottom of the pack holder.

With reference to FIGS. 5 and 6, the pack holder 2 is in the form of a boxlike case having an open top side, with its interior divided by a plurality of partitions 22 into compartments. Magnetic disc packs 1 are accommodated in the respective compartments. The bottom wall of the pack holder 2 is formed with a plurality of elongated lever insertion holes 21 for the respective compartments.

The holder 2 is further formed at the lower end of its front side with cavities 23, 23 for positioning the holder as attached to the holder carriage to be described later.

Pack Holder Drive Assembly 5

Figure 4:
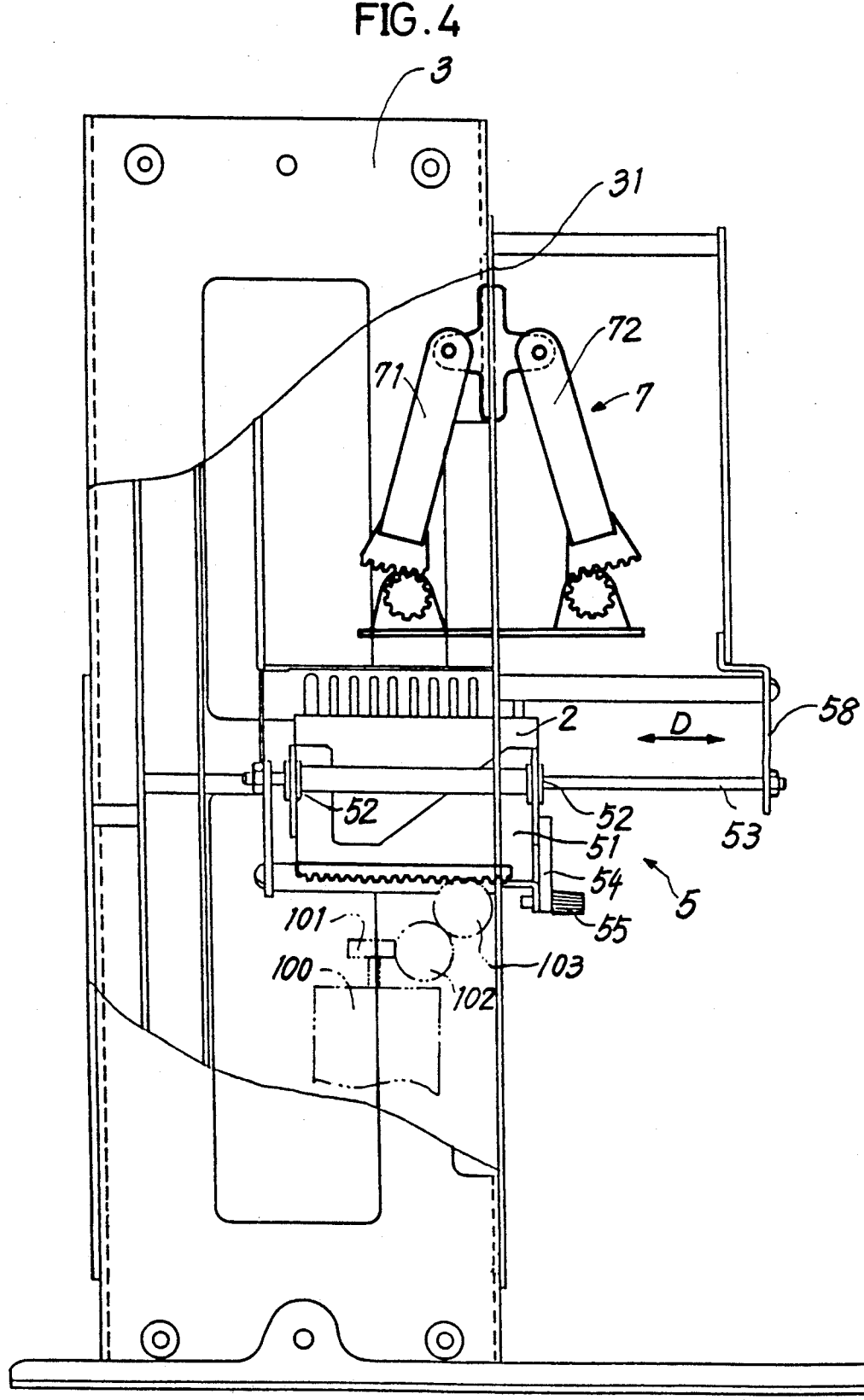
FIG. 4 is a left side elevation of the apparatus.

With reference to FIG. 4, the pack holder drive assembly 5 for reciprocatingly driving the pack holder 2 horizontally comprises a frame 58 fixed to the frame 3, and a holder carriage 51 reciprocatingly movably in engagement with the fixed frame 58.

Figure 7:
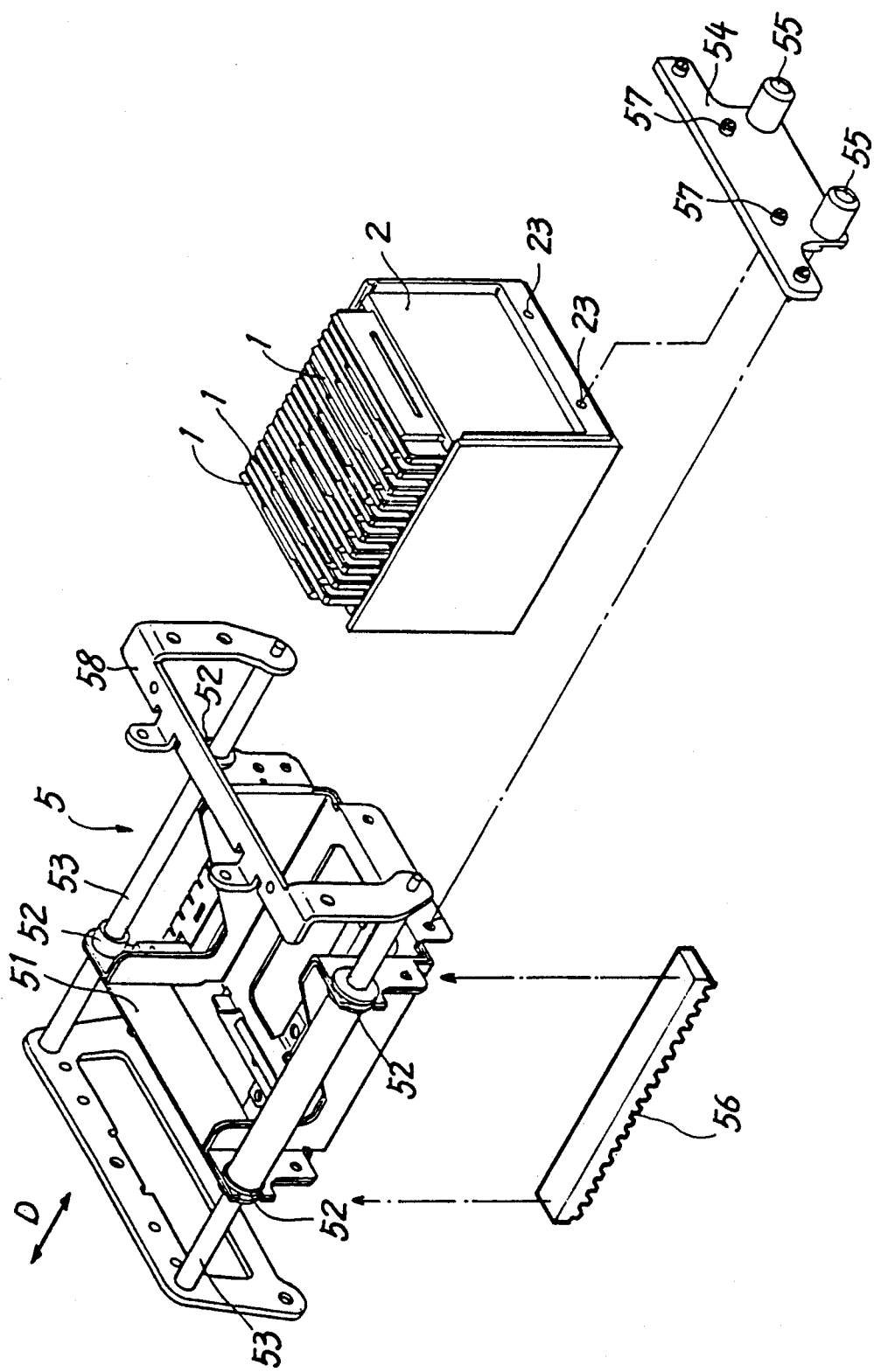
FIG. 7 is an exploded perspective view showing a holder carriage for carrying the pack holder.

As seen in FIG. 7, the fixed frame 58 has two guide rods 53, 53 extending horizontally in parallel to each other. The holder carriage 51 is fitted to the guide rods 53 by means of metal bushes 52.

The holder carriage 51 has a space for accommodating the pack holder 2. A retaining plate 54 for confining the holder 2 in the space is removably attached to the carriage 51 with two screws 55. Two positioning pins 57 attached to the retaining plate 54 are fitted in the respective cavities 23 of the holder 2, whereby the holder 2 is positioned in place relative to the carriage 51.

A rack 56 extending in the direction (arrow D) of movement of the pack holder 2 is secured to the bottom side of the holder carriage 51. The rack 56 is coupled to a first motor 100 for reciprocatingly driving the carriage 51 along with the holder 2.

Figure 2:
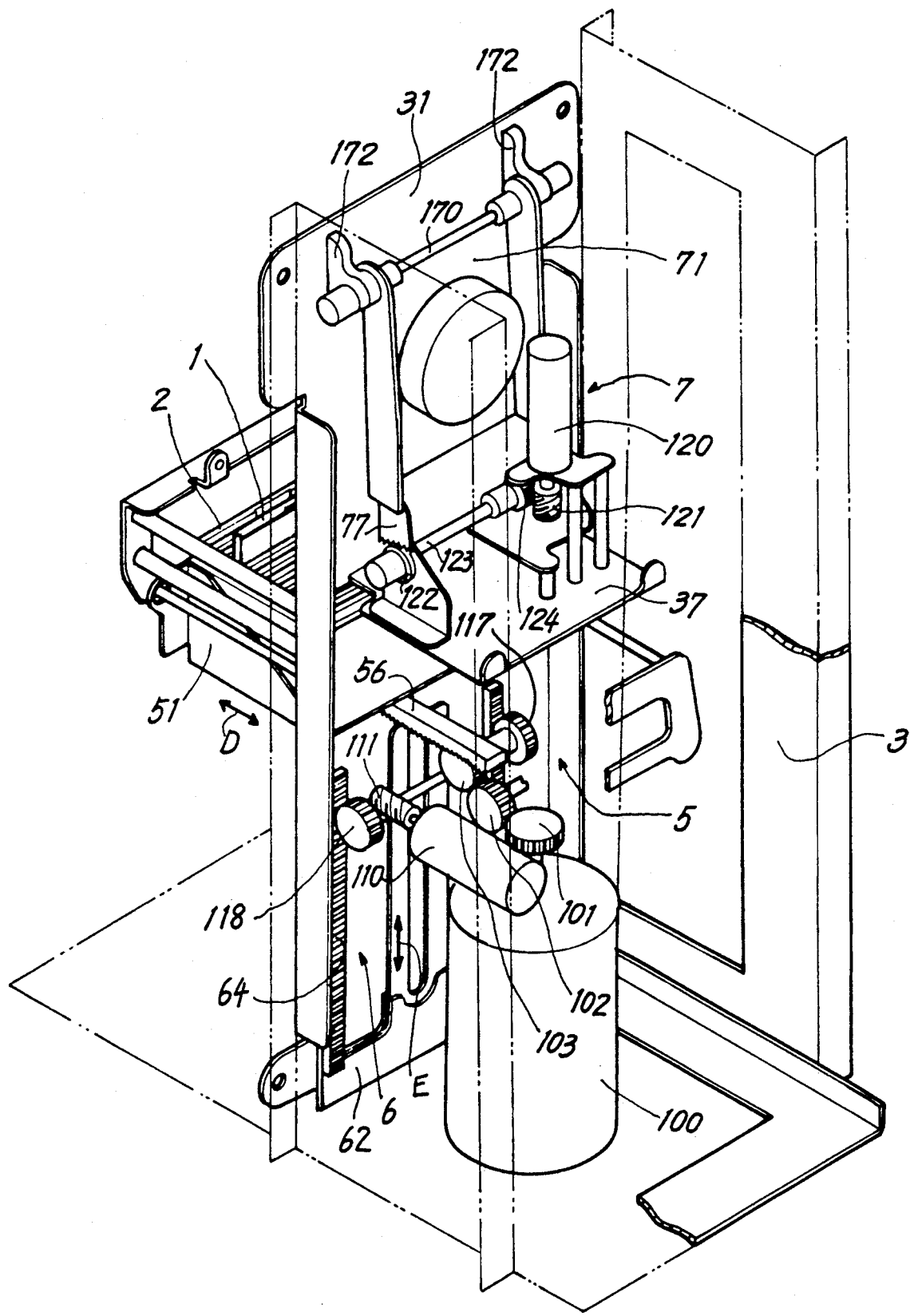
FIG. 2 is a perspective view partly broken away and showing the apparatus as it is seen from a direction 90 degrees different from the direction in which the apparatus is seen in FIG. 1.

As shown in FIG. 2, the first motor 100 is mounted on the bottom of the frame 3. A drive helical gear 101 is fixed to the output shaft of the first motor 100. The rotation of the gear is transmitted to the rack 56 via an intermediate gear 102 and a driven spur gear 103 supported by the frame 3.

Accordingly, the pack holder 2 can be moved forward or backward a desired distance by controlling the rotation of the first motor 100 to bring the selected one of the packs 1 in the holder 2 to the first rest position G shown in FIG. 3.

Pack Transport Assembly 6

Figure 10:
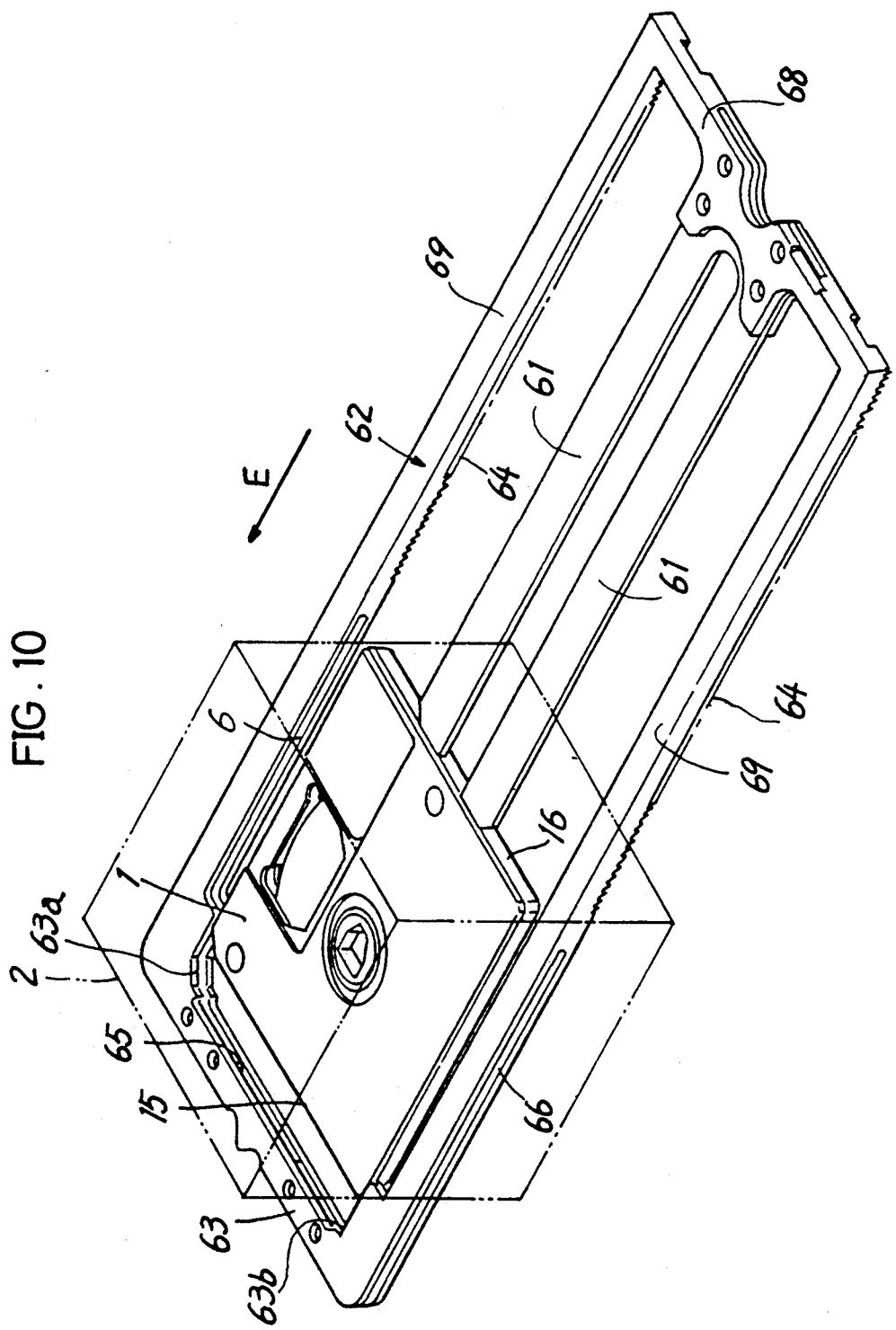
FIG. 10 is a perspective view showing the pack in the first rest position and the transport member.
Figure 11:
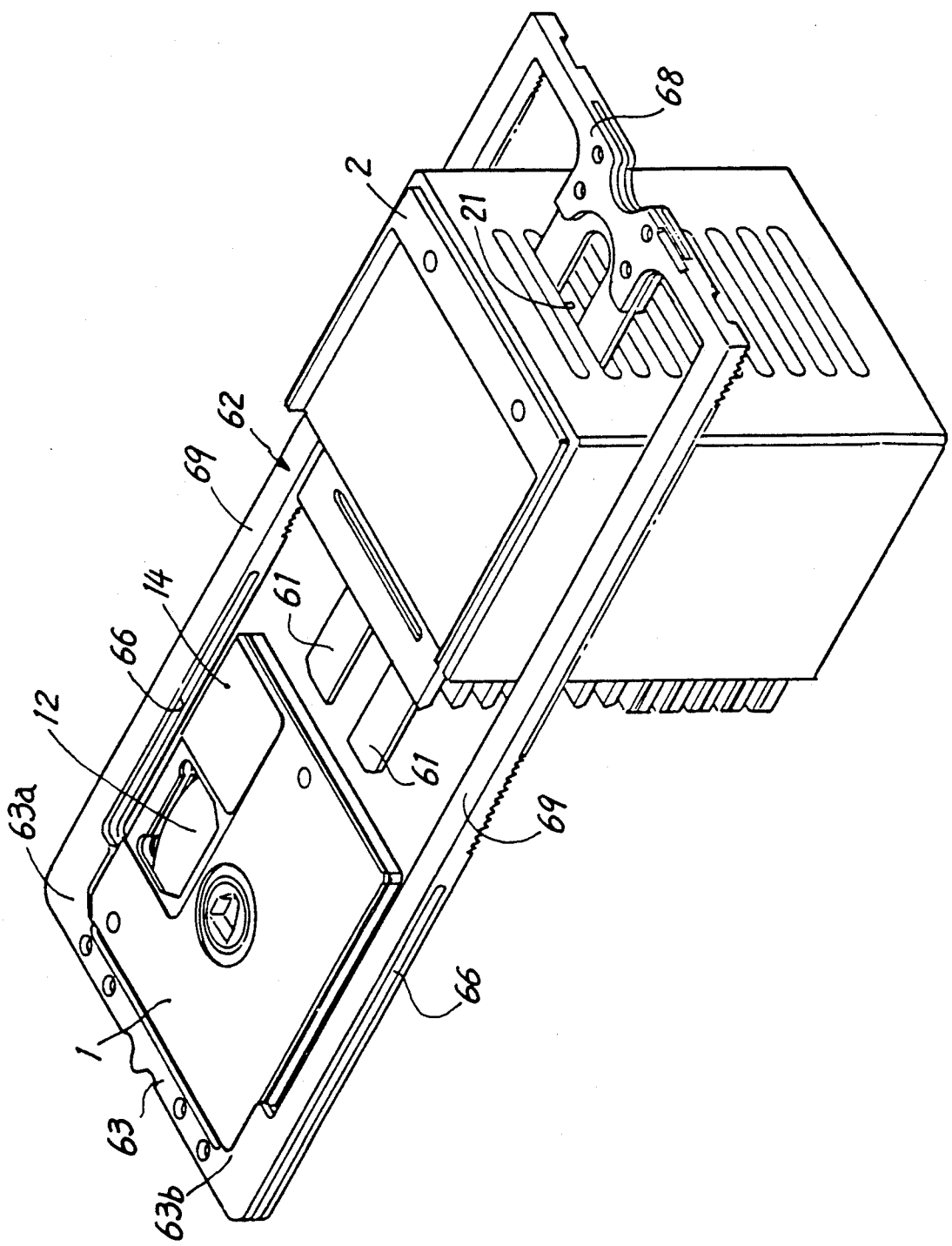
FIG. 11 is a perspective view showing the pack in the second rest position and the transport member.

With reference to FIGS. 10 and 11, the pack transport assembly 6 comprises a transport member 62 in the form of an elongated rectangular frame and including a front frame member 63, rear frame member 68 and opposed side frame members 69, 69. The member 62 has two pack pushing levers 61, 61 extending from the rear frame member 68 toward the front frame member 63. As seen in FIG. 11, each lever 61 has such a width and length that it is insertable through the hole 21 in the holder 2. Between the levers 61, 61 and the front frame member 63, there is a space for accommodating the pack 1 with some clearance formed therearound.

As shown in FIG. 10, the front frame member 63 is provided with a pair of restraining portions 63a, 63b shaped in conformity with the shape of the front side wall corners of the pack 1. When the pack 1 should be accommodated in the holder 2 in a wrong orientation, these restraining portions 63a, 63b produced an increase in the motor load of the holder drive assembly 5, indicating the wrong orientation.

The front frame member 63 of the transport member 62 is formed with a first slit 65 for the insertion of a stopper 41 (FIG. 9) therethrough. The side frame members 69 are each formed with a second slit 66 for the insertion of pack guide portions 43, 44 (FIG. 9) therethrough.

A rack portion 64 is formed on the rear side of each side frame member 69 of the transport member 62. As seen in FIG. 2, drive gears 117, 118 are always in mesh with the respective rack portions 64, 64, whereby the transport member 62 is driven upward or downward. The transport member 62 is guided for the vertical movement by the guide means 4 (FIG. 9) to be described later.

Figure 13:
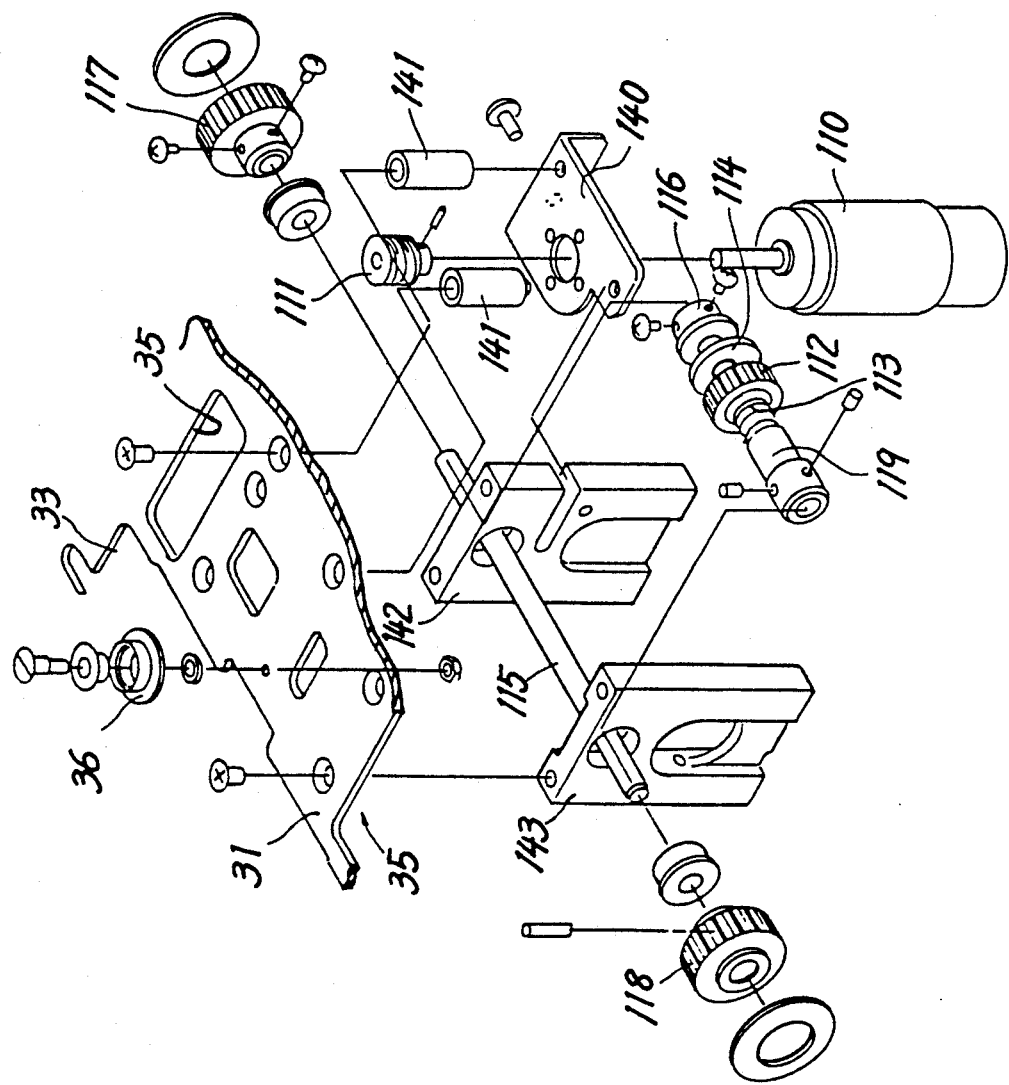
FIG. 13 is an exploded perspective view showing drive means for the transport member.

The drive gears 117, 118 are coupled to the second motor 110 by a gear mechanism as seen in FIG. 13.

The second motor 110 is secured to a mount plate 140 supported by spacers 141, 141 on the base plate 31. A worm 111 is secured to the output shaft of the motor.

In the vicinity of the second motor 110, a drive shaft 115 is freely rotatably supported by a pair of support members 142, 143 on the base plate 31. The pair of drive gears 117, 118 meshing with the racks 64 are fixed to the respective ends of the drive shaft 115. These gears 117, 118 are projected from openings 35 formed in the base plate 31 to mesh with the racks 64.

The rotation of the worm 111 is transmitted to the drive shaft 115 via a torque limiter. A pair of tubular flanges 116, 119 spaced apart at a distance are secured to the middle portion of the drive shaft 115. A first gear 112 meshing with the worm 11 at all times and an annular friction plate 114 are mounted on the drive shaft 115 freely rotatably and movably axially thereof and are positioned between the two flanges. The first gear 112 is biased toward the friction plate 115 by a spring 113 interposed between the gear 112 and the flange 119.

Accordingly, the torque of the second motor 110 is transmitted to the racks 64 shown in FIG. 2 via the worm 111, first gear 112, friction plate 115, flange 116, drive shaft 115 and drive gears 117, 118 to drive the transport member 62 upward or downward.

Figure 8:
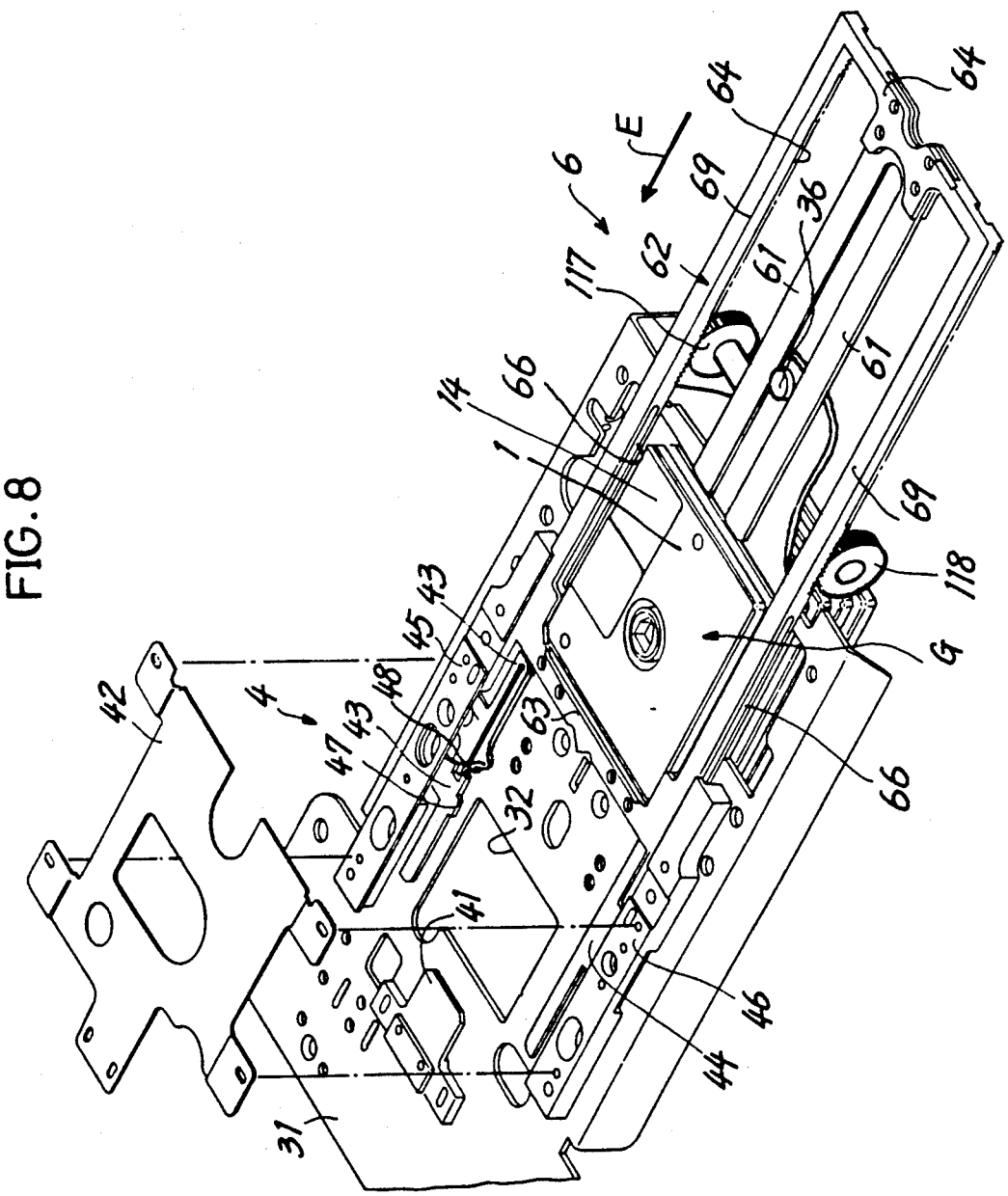
FIG. 8 is an exploded perspective view showing a magnetic sheet pack in a first rest position, and a transport member and guide means for the pack.

With reference to FIG. 13, the base plate 31 is provided with a guide piece 36 positioned between the two gears 117, 118. As seen in FIG. 8, the guide piece 36 is interposed between the pack pushing levers 61, 61 of the transport member 62 for guiding the movement of the levers.

Guide Means 4

As shown in FIG. 8, the transport member 62 is held between a pair of guide portions 45, 46 arranged in parallel to each other on the base plate 31 for guiding the reciprocating movement of the pack 1 in the directions of arrows E.

The magnetic disc pack 1 held by the transport member 62 is guided for reciprocating movement along a path provided in conformity with the shape of the pack 1 as will be described later.

Figure 9:
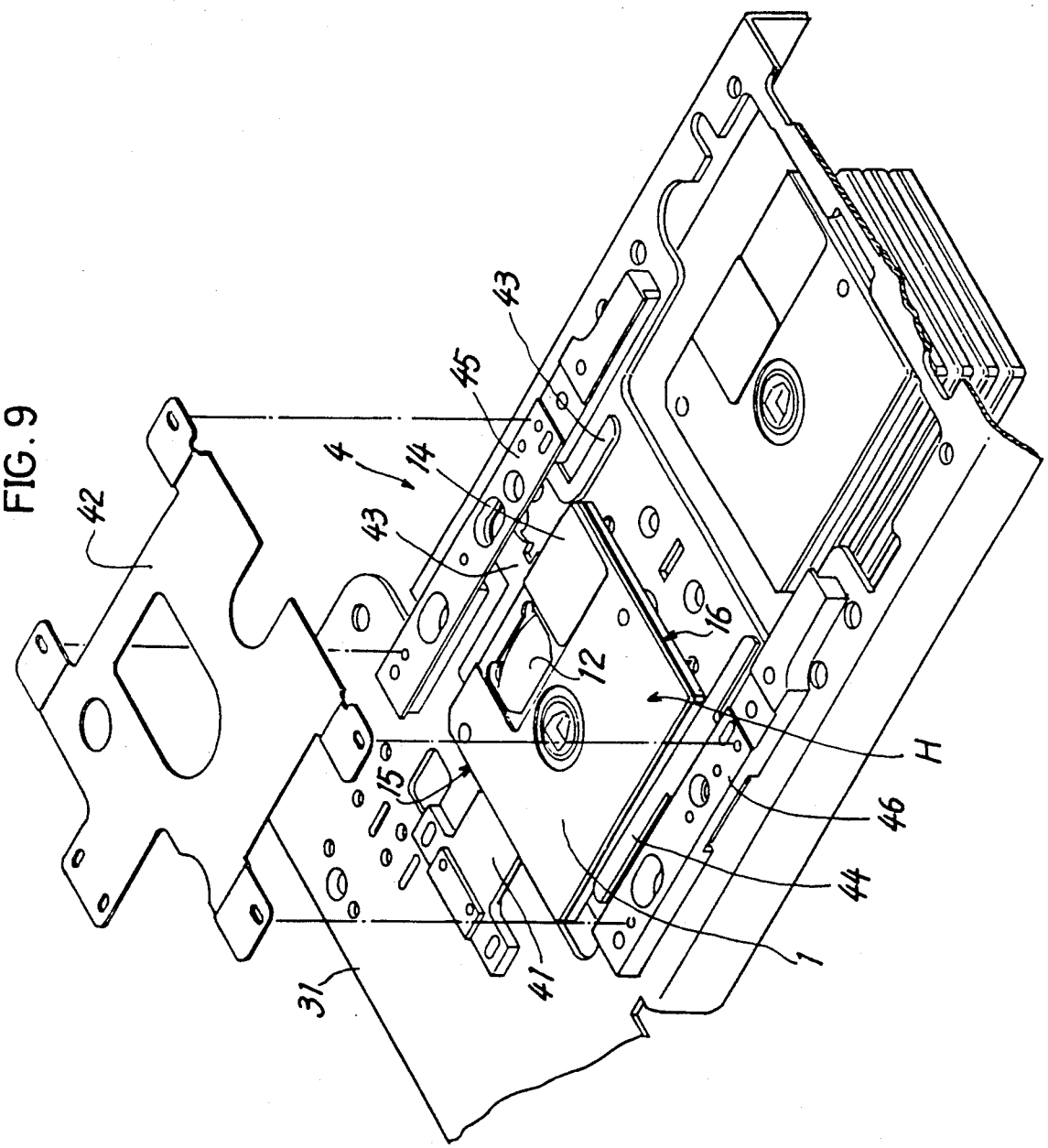
FIG. 9 is an exploded perspective view showing the pack in a second rest position and the guide means therefor.

Provided inside the respective guide portions 45, 46 are the pair of pack guide portions 43, 44 for guiding the reciprocating movement of the pack holder 2. As already stated, these guide portions 43, 44 are inserted through the slits 66, 66 in the transport member 62 to come into sliding contact with opposite sides of the pack 1 as seen in FIG. 9. The transport member 62 is not shown in FIG. 9.

The base plate 31 is fixedly provided with a retaining plate 42 for holding the pack to the base plate 31 when the pack 1 is moved from the first rest position to the second rest position.

The base plate 31 further has fixed thereto the stopper 41 adapted to contact the front side wall 15 of the pack 1 to position the pack 1 in the second rest position H. As already stated, the stopper 41 comes into contact with the pack front wall 15 through the slit 65 formed in the front frame member 63 of the transport member 62.

As seen in FIG. 8, the pack guide portion 43 has a pair of claws 47, 48 projecting toward the path for the pack 1 for opening and closing a shutter 14 (FIG. 9) of the sheet pack 1 with the movement of the pack as already known (see, for example, Unexamined Japanese Patent Publication SHO 61-80580).

Chucking Mechanism 7 and Recording-Reproduction Assembly 8

The magnetic disc pack 1 is moved straight from the first rest position G shown in FIG. 8 to the second rest position H shown in FIG. 9 and thereafter held on its opposite sides by the chucking mechanism 7 in the second rest position, whereupon signals are recorded on or reproduced from the disc by the recording-reproduction assembly 8 having a magnetic head, etc.

Figure 14:
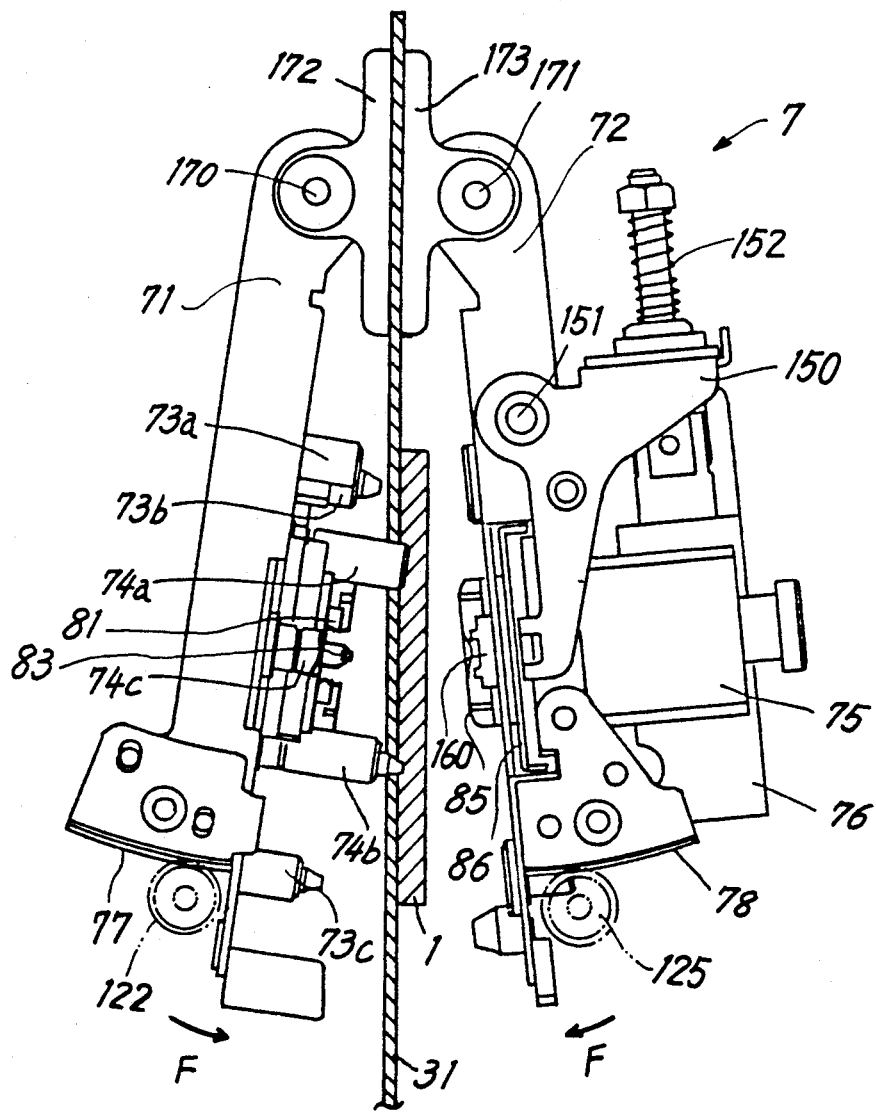
FIG. 14 is a left side elevation showing a chucking mechanism in an open state.
Figure 15:
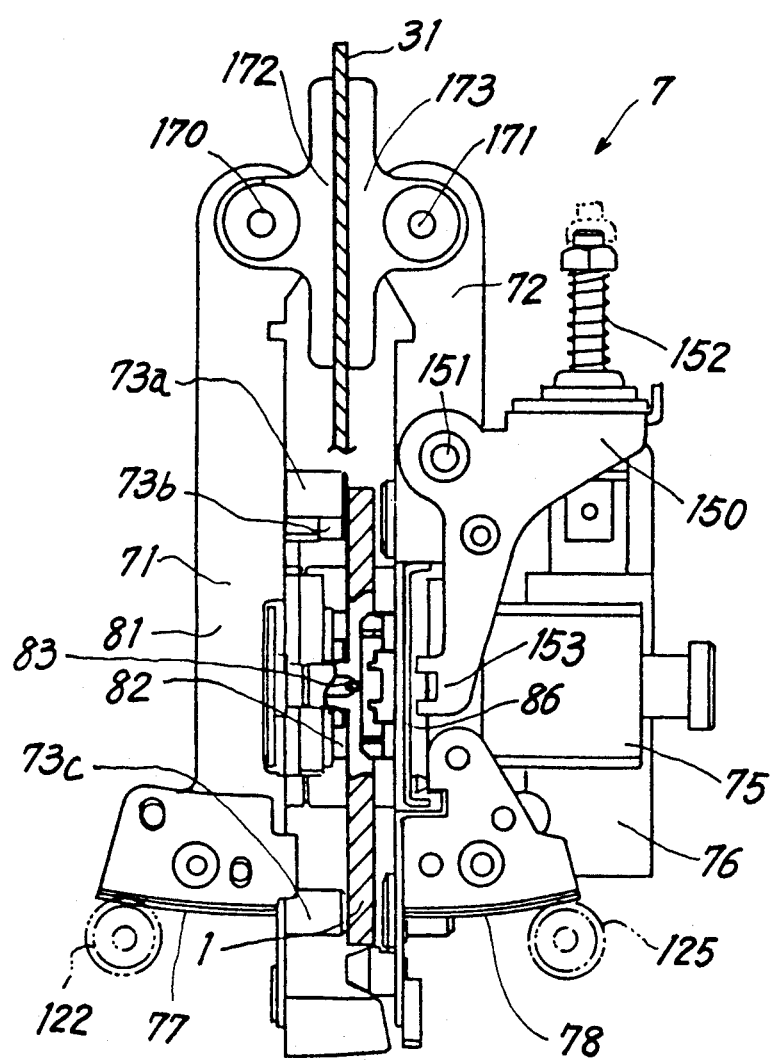
FIG. 15 is a left side elevation showing the chucking mechanism in a closed state.

With reference to FIGS. 14 and 15, the chucking mechanism 7 comprises first and second bases 71, 72 provided on the respective sides of the base plate 31 and movable toward or away from each other. The bases 71, 72 are provided with the recording-reproduction assembly 8 comprising a spindle 81 for drivingly rotating the magnetic disc in the pack 1, the above-mentioned magnetic head 83, etc.

Shafts 170, 171 are rotatably supported by support members 172, 173, respectively, on the respective sides of the base plate 31 at its opposite ends. The first and second bases 71, 72 are supported, each at its upper end, by the shafts 170, 171, respectively.

Figure 16:
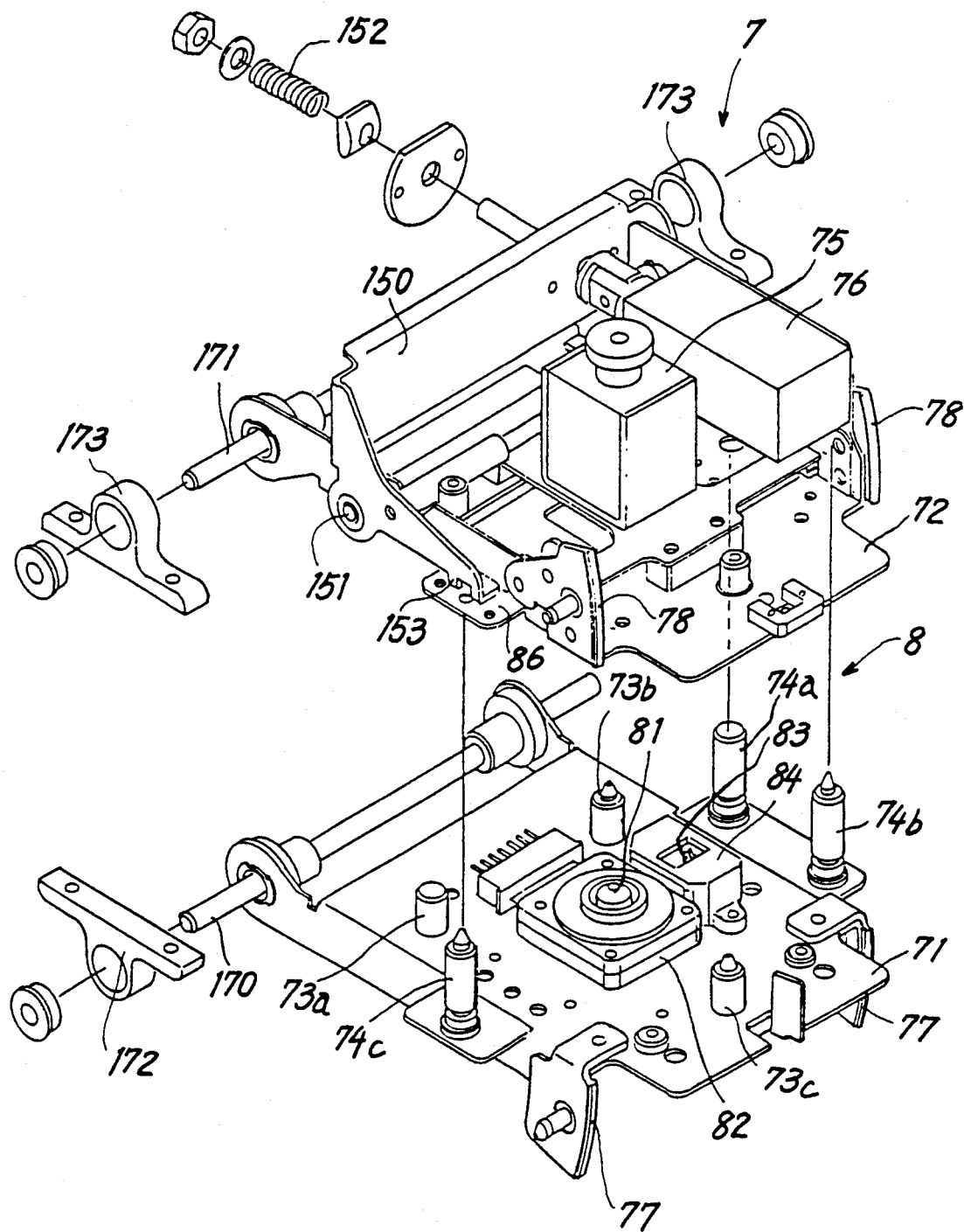
FIG. 16 is an exploded perspective view of the chucking mechanism.
Figure 17:
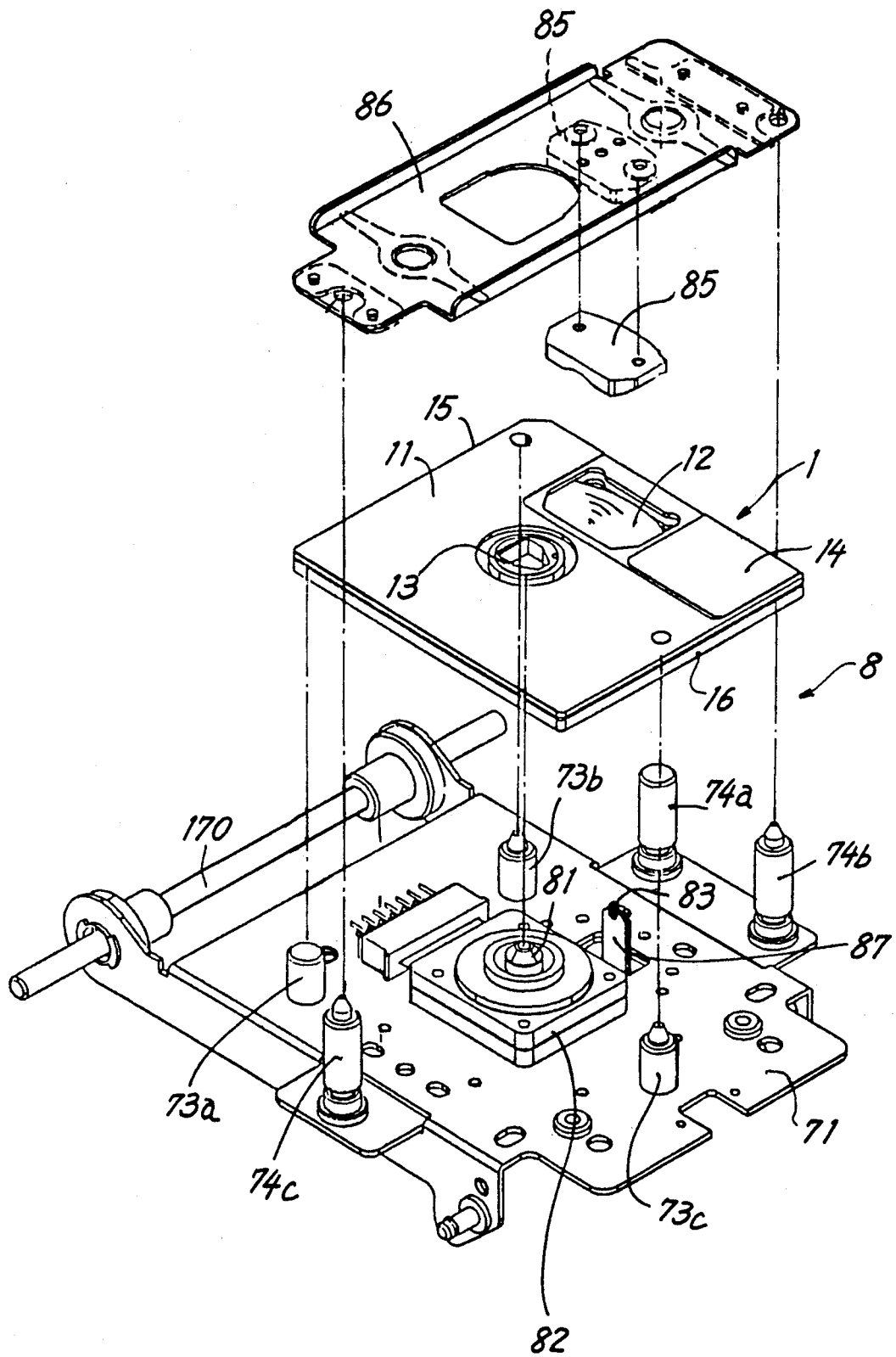
FIG. 17 is an exploded perspective view of a recording-reproduction assembly.

As shown in FIG. 17, the first base 71 is centrally provided with the spindle 81 and a spindle motor 82 for driving the spindle 81. Arranged around the spindle 81 are three reference pins 73a, 73b and 73c for positioning the casing 11 of the pack 1, and three reference pins 74a, 74b and 74c for positioning a base plate 86. Disposed at one side of the spindle 81 are the magnetic head 83 for recording or reproducing signals and a guide plate 84 for guiding the rotation of the magnetic sheet as seen in FIG. 16.

The magnetic head 83 is coupled to transport means (not shown) by a known bimorph plate 87 (FIG. 17) and is transported radially of the disc for recording or reproducing signals (see "SANYO TECHNICAL REVIEW, Vol. 18, No. 2, Aug. 1966, pp. 37–38).

As shown in FIG. 14, a first solenoid 75 is mounted on the second base 72 for properly fitting the center hub 13 of the magnetic disc in the pack 1 to the spindle 81. A pressing member 160 is connected to the outer end of the output shaft of the first solenoid 75 for directly pressing the center hub 13 against the disc spindle 81.

The second base 72 further has the base plate 86 shown in FIG. 17 and biased by a spring away from the spindle 81. Attached to the base plate 86 is a disc restraining pad 85 already known for holding the magnetic disc 12 between the pad 85 and the guide plate 84 to restrain the disc from vibrating with the rotation of the disc.

Further as seen in FIG. 16, the second base 72 carries an L-shaped pressing arm 150 movably supported by a pivot 151 and having a free end 153 extending toward the rear side of the base plate 31. A second solenoid 76 is mounted on the second base 72 for reciprocatingly driving the pressing arm 150. The plunger of the solenoid 76 has a spring 152 for biasing the arm 150 into rotation toward the spindle 81.

The first and second bases 71, 72 are formed with sector gears 77, 78, respectively, at opposite sides of their free ends for driving the bases toward or away from each other. The sector gears 77, 78 are coupled to a third motor 120 (FIG. 2) and a fourth motor 130 (FIG. 1), respectively.

As seen in FIG. 2, the third motor 120 is mounted on a support plate 37 provided on the frame 3 and positioned toward the first base 71. A worm 121 is secured to the output shaft of the motor 120 and is in mesh with a gear 124 fixed to a drive shaft 123 which is rotatably supported on the support plate 37. As shown in FIGS. 2 and 14, drive gears 122 mounted on the respective ends of the drive shaft 123 are in mesh with the sector gears 77 at all times.

Similarly, drive gears 125 meshing with the sector gears 78 and the fourth motor 130 for driving the gears 125 are supported by the frame 3 and disposed close to the second base 72 as seen in FIG. 1.

Accordingly, the third and fourth motors 120, 130, when driven forward or reversely at the same time, open or close the chucking mechanism 7 as shown in Figs. 14 and 15.

Each of the gear means provided between the motors 120, 130 and the drive gears 122, 125 includes the same torque limiter (not shown) as the one included in the pack transport assembly described with reference to FIG. 13.

Figure 12:
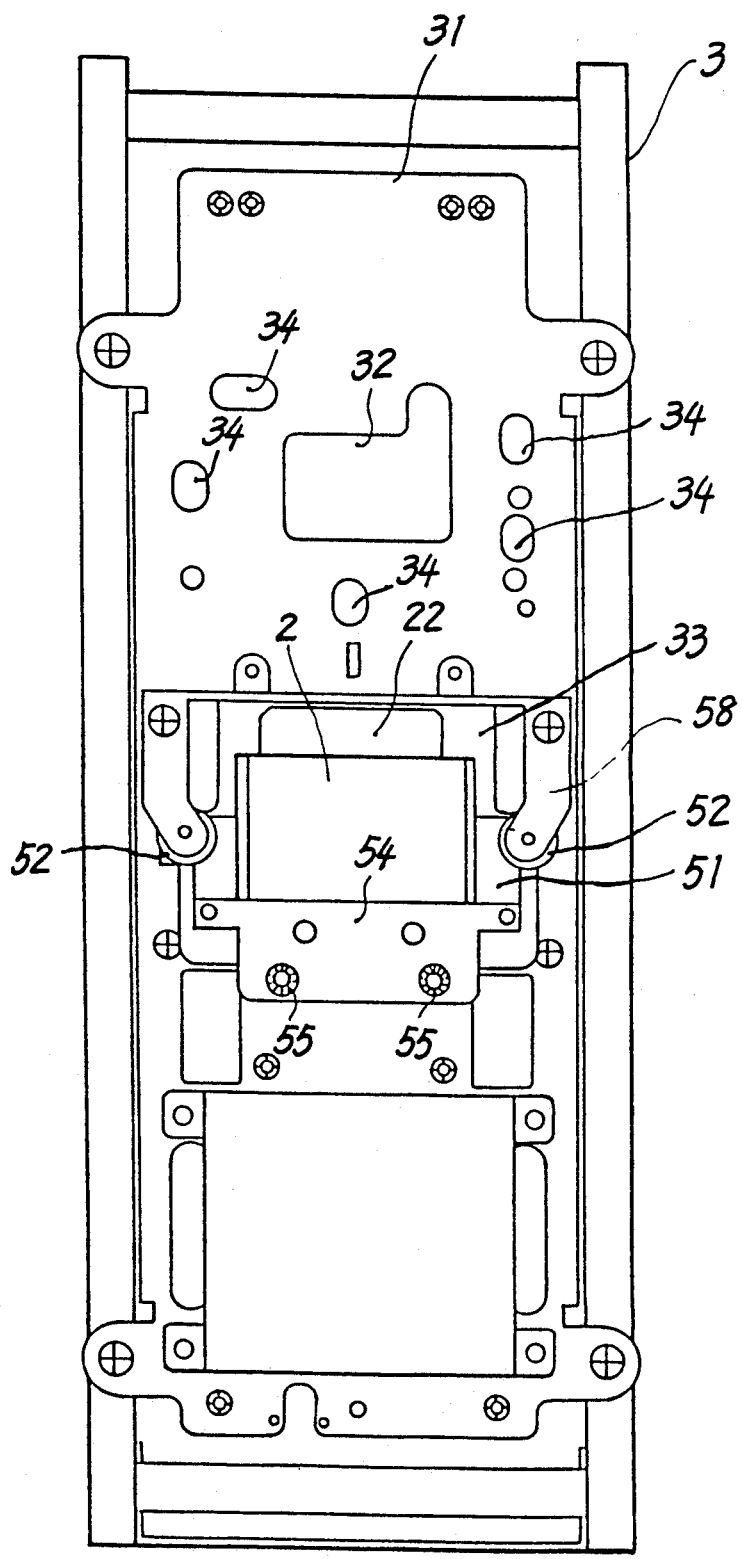
FIG. 12 is a front view showing a base plate having the pack holder attached thereto.

As seen in FIG. 12, the base plate 31 is formed with a hole 32 for the spindle 81 to pass through, and pin holes 34 for the reference pins to pass through with the closing movement of the chucking mechanism 7.

When the chucking mechanism 7 is closed as shown in FIG. 15, the reference pins 73a, 73b, 73c are engaged with the jacket 11 of the pack 1, and an elastic pressing piece (not shown) on the second base 72 presses the casing against the reference pins 73a to 73c, whereby the magnetic disc pack 1 is positioned in place as slightly raised off the base plate 31.

Further the closing of the chucking mechanism 7 brings the reference pins 74a, 74b, 74c, shown in FIG. 17, into engagement with the base plate 86, thereby positioning the disc restraining pad 85 in place relative to the pack 1.

Figure 18:
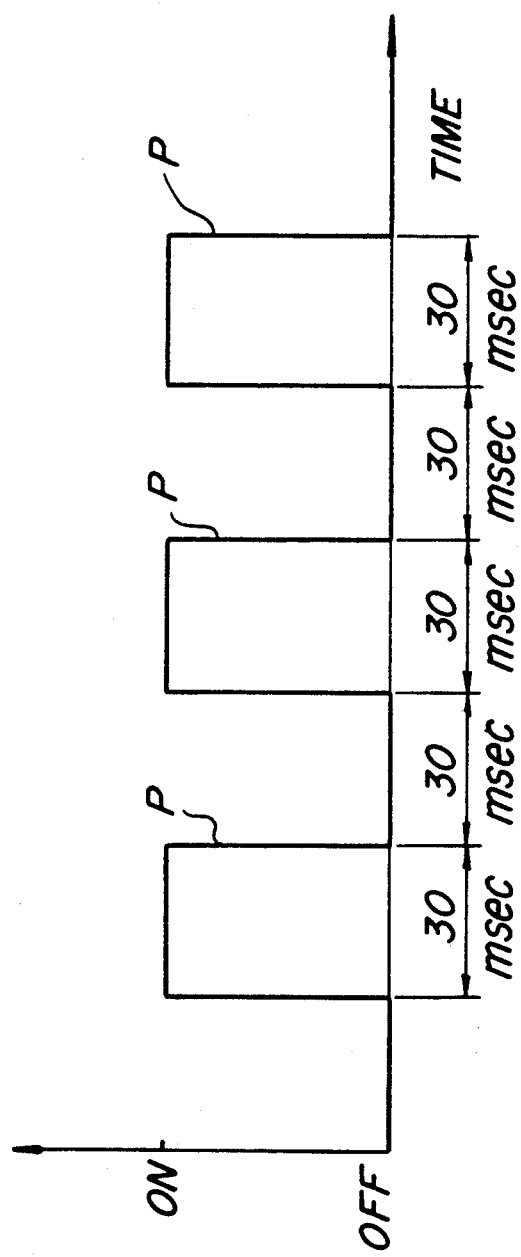
FIG. 18 is a waveform diagram showing pulses for driving a pressing member of the recording-reproduction assembly.

When signals are to be recorded or reproduced with the pack 1 held in place by the mechanism 7 as seen in FIG. 15, three drive pulses P shown in FIG. 18 are fed to the first solenoid 75 with a period of 30 msec.

Consequently, the pressing member 160 shown in FIG. 14 presses the hub 13 of the pack 1 three times to reliably fit the hub to the spindle. If the center hub is slightly out of alignment with the spindle 81 when the pack 1 has been completely chucked, the position of the magnetic disc can be corrected by degrees to properly fit the hub to the spindle 81 by pressing the hub and releasing the hub from the pressure repeatedly in this way.

On completion of the chucking of the pack 1 as shown in FIG. 15, the spindle motor 82 is initiated into rotation, and the second solenoid 76 withdraws its output shaft from the broken-line projected position to compress the spring 152, causing the spring to move the pressing arm 150 clockwise. The arm 150 in turn pushes the base plate 86 toward the spindle 81, bringing the sheet restraining plate 85 shown in FIG. 17 into sliding contact with the magnetic sheet 12 of the pack 1. This permits the magnetic head 83 to come into sliding contact with the signal recording face of the disc 12 under a suitable pressure.

The pack changing operation and signal reproduction operation of the present apparatus will be described below.

Loading of Magnetic Disc Pack

When an instruction is given for the reproduction of signals from one of the packs 1 in the pack holder 2, the chucking mechanism 7 is opened as seen in FIG. 14.

Next, the first motor 100 of the pack holder drive assembly 5 of FIG. 2 is given a control signal in accordance with the position of the selected pack 1 within the holder, whereupon the holder 2 is moved and positioned so as to set the pack 1 in the first rest position.

The second motor 110 of the pack transport assembly 6 is then started to drive the transport member 62 upward, thereby bringing the pack pushing levers 61, 61 of the member 62 into contact with the rear side wall 16 of the pack 1 in the holder 2 through the lever insertion hole 21 in the holder to cause the levers to push up the pack 1.

The pack 1 advances straight toward the second rest position along the path defined by the pair of pack guide portions 43, 44, base plate 31 and retaining plate 42. During this travel, the shutter 14 is opened as seen in FIG. 9. The pack 1 eventually stops upon the front side wall 15 thereof coming into contact with the stopper 41, whereupon the second motor 110 is deenergized.

The pack 1 is accurately brought to the second rest position by the positioning members, i.e. the stopper 41 and the pair of guide portions 43, 44.

Subsequently, the third and fourth motors 120, 130 are started, causing the chucking mechanism 7 to chuck the pack as already described. The spindle motor 82 (FIG. 3) is thereafter initiated into rotation at 3600 r.p.m., and the magnetic disc is held by the recording-reproduction assembly 8.

Signal Reproduction

The head transport means operates to position the magnetic head 83 for the track from which signals are to be reproduced, and the head starts reading signals.

One field of signals read by the head 83 is demodulated by a signal reproduction circuit (not shown) and then written in a video memory (not shown). The signals are then read out from the video memory to reproduce a still image.

In the above process, the spindle motor 82 is deenergized when the signals have been written in the video memory, and the second solenoid 76 shown in FIG. 15 is advanced to release the magnetic disc from the disc restraining pad 85 and the guide plate 84 to prevent the disc from deformation.

When signals are to be reproduced from another track of the pack 1, the spindle motor 82 is restarted, and the second solenoid 76 is energized to bring the disc restraining pad 85 into sliding contact with the disc and confine the disc in position. The transport means positions the magnetic head 83 for the contemplated track. The disc restraining pad 85 may be brought into sliding contact with the magnetic disc after the magnetic head 83 has been transported.

After one field of signals has been read from the track and stored in the memory, the spindle motor 82 is deenergized.

Unloading of Magnetic Disc Pack

When an instruction is given for the reproduction of signals from another magnetic disc pack 1 in the holder 2, the third and fourth motors 120, 130 are started to release the previous pack 1 from the chucking mechanism 7.

The second motor 110 shown in FIG. 2 is then started to lower the transport member 62 along the base plate 31. During the descent, the front frame member 63 of the transport member 62 comes into contact with the pack 1, as shown in FIG. 11, transporting the pack 1 toward the holder 2. Upon the return of the transport member 62 to the initial position shown in FIG. 3, the second motor 110 is deenergized.

The pack 1, when released from the pair of pack guide portions 43, 44 shown in FIG. 8, is free to fall under gravity, such that after the transport member 62 is halted, the pack 1 falls into the holder 2.

When the pack 1 is to be forcibly collected in the pack holder 2, the transport member 62 as returned to the initial position of FIG. 3 is further lowered by driving the second motor 110 to cause the member 62 to push the pack 1 downward into contact with the bottom wall of the holder 2. The second motor 110 is thereafter reversely rotated to return the transport member 62 to its initial position.

The first motor 100 is thereafter driven to move the pack holder 2 so that the second pack 1 selected can be set in the first rest position.

The foregoing loading and chucking operations then follow to reproduce signals from the second pack 1.

Figure 19:
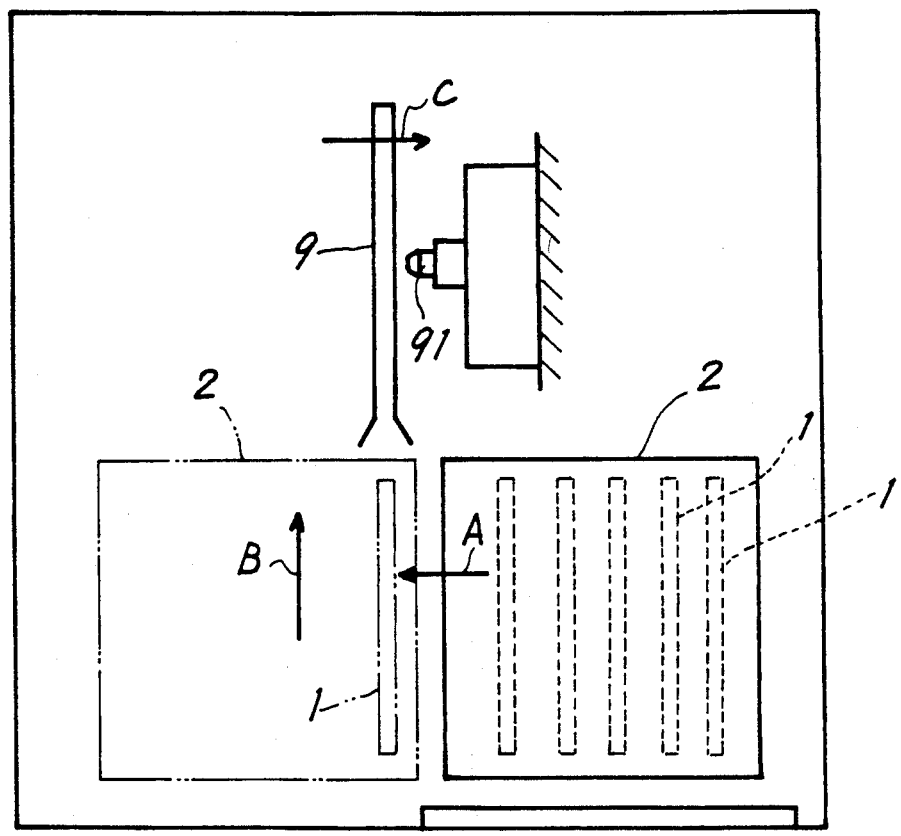
FIG. 19 is a diagram illustrating the operation of a conventional apparatus.

With the apparatus described above, the desired magnetic disc pack 1 can be set in the recording-reproduction position or collected in the pack holder 2 merely by being moved straight upward from the holder 2 or downward, so that the pack 1 can be changed more rapidly than in the conventional apparatus of FIG. 19.

Figure 20:
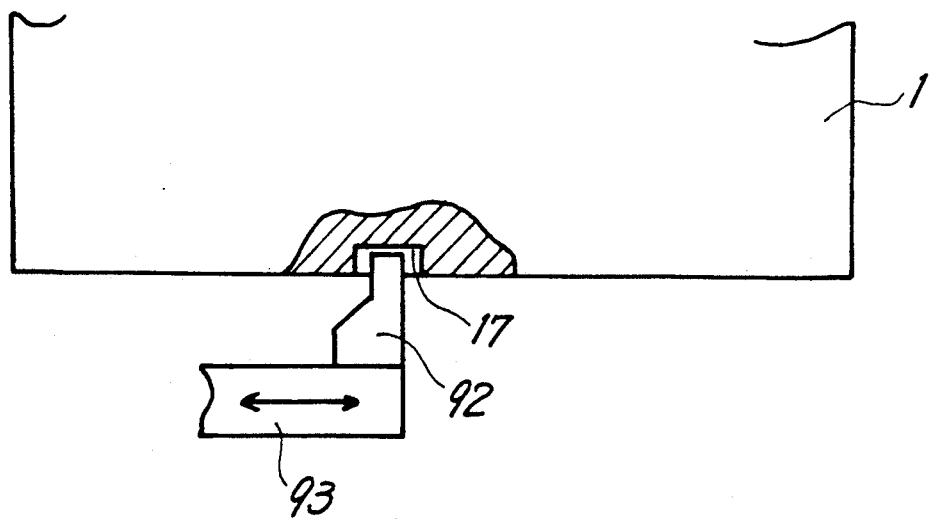
FIG. 20 is a side elevation partly broken away and showing the pack drive mechanism of the conventional apparatus.

The accuracy with which the pack 1 is set in the second rest position is dependent only on the stopper 41 and the pair of pack guide portions 43, 44 but is not influenced by the accuracy of movement of the transport member 62. According to the present invention, therefore, the magnetic disc pack 1 can be set in the recording-reproduction position with much higher accuracy than when the pack is positioned by the reciprocating mechanism of the conventional apparatus in direct engagement with the pack as seen in FIG. 20.

The construction of the present apparatus is not limited to that of the foregoing embodiment but can be modified variously by one skilled in the art without departing from the scope of the invention as defined in the appended claims.

For example, the path of transport of the magnetic disc pack 1 is not always vertical but can be horizontal to achieve the same result as above. In this case, the pack withdrawing opening of the holder 2 is oriented horizontally, and the transport member 62 is driven horizontally.

Although motors and solenoids are used as power sources for the respective mechanisms or assemblies to assure a highly reliable operation, a common power source can be coupled to such components via known power transmission changing means to use the power source commonly for the components.

The component assemblies or mechanisms can be controlled in sequence not only mechanically using limit switches or the like but also by various known methods, for example, by detecting the amount of rotation of the motor.

Furthermore, the recording-reproduction apparatus of the invention adapted for automatic pack changing is usable not only for recording or reproducing still images or pictures but also for recording or reproducing the video signals or audio signals of motion pictures.

What is claimed is:

1. A recording-reproduction apparatus for magnetic disc packs with an automatic pack changing mechanism comprising:

a pack holder for accommodating a plurality of magnetic disc packs in a linear arrangement;

a pack holder drive assembly for driving the pack holder in a first plane direction parallel to the linear arrangement of the magnetic disc packs in the pack holder to position one of the magnetic disc packs selected for recording or reproduction in a first rest position where said selected magnetic disc pack is to be withdrawn from the pack holder;

a pack transport assembly removing the selected magnetic disc pack in the first rest position in a second plane direction perpendicular to said first plane from the pack holder and transporting the selected magnetic disc pack to a second rest position on a line extending in said second plane direction of removal;

a fixed base plate fixedly provided along a path of transport of the selected magnetic disc pack parallel to said second plane direction to support said selected magnetic disc pack in said second rest position;

a pair of bases pivotally connected to and on opposite sides of the fixed base plate, each of the pair of bases movable toward said fixed base plate in an opposed relationship with the second rest position for a recording-reproducing operation;

a drive means, positioned on one of said pair of bases, for rotating a magnetic disc provided within said selected magnetic disc pack; and a recording-reproducing assembly including a pressing member provided on one of the pair of bases to hold the selected magnetic disc pack in the second rest position against said fixed base plate for recording and reproducing by a magnetic head provided on said other of the pair of bases.

2. An apparatus as defined in claim 1 wherein the pack transport assembly comprises guide means for guiding movement of the selected magnetic disc pack from the first rest position to the second rest position, and a transport member having at least one pushing lever movable into the pack holder through a hole formed therein for pushing the selected magnetic disc pack toward the second rest position, the guide means provided with a positioning member to contact the selected magnetic disc pack in the second rest position.

3. An apparatus as defined in claim 2 wherein the transport member is in a form of a rectangular frame which surrounds the selected magnetic disc pack and pack holder and has a rear frame member and a front frame member, a pair of pack pushing levers extending from the rear frame member toward the front frame member, and a space for accommodating the selected magnetic disc pack therein is formed between the front frame member and the pack pushing levers.

4. An apparatus as defined in claim 3 wherein the guide means comprises a pair of pack guide portions arranged at respective sides of the path of transport of the selected magnetic disc pack, and a stopper serving as the positioning member, and the pair of pack guide portions and the stopper are to contact the selected magnetic disc pack through slits formed in opposite side frame members and the front frame member of the transport member.

5. An apparatus as defined in claim 1 wherein the recording-reproducing assembly having mounted on one of the pair of bases a spindle for drivingly rotating a magnetic disc within the selected magnetic disc pack and a magnetic head, the recording-reproducing assembly further having mounted on the other of the pair of bases said pressing member for pressing a center hub of the selected magnetic disc against said spindle.

* * * * *